United States Patent [19]
Jordan et al.

[11] Patent Number: 5,150,831
[45] Date of Patent: Sep. 29, 1992

[54] REACTOR VESSEL

[75] Inventors: Robert E. Jordan, Cleveland; Michael J. Hughes, Hinkley, both of Ohio

[73] Assignee: The B.F. Goodrich Company, Brecksville, Ohio

[21] Appl. No.: 693,832

[22] Filed: Apr. 30, 1991

Related U.S. Application Data

[62] Division of Ser. No. 344,780, Apr. 28, 1989.

[51] Int. Cl.$^5$ ............................................. B23K 31/02
[52] U.S. Cl. ................................. 228/184; 29/890.03; 29/515; 228/183
[58] Field of Search ............... 228/183, 184, 127, 136; 29/890.03, 505, 515

[56] References Cited

U.S. PATENT DOCUMENTS

| | | | |
|---|---|---|---|
| 1,329,479 | 2/1920 | Savon | 29/515 |
| 2,915,292 | 12/1959 | Gross | 257/95 |
| 3,374,833 | 5/1966 | Bernard | 165/140 |
| 3,397,440 | 8/1968 | Dalin | 228/183 |
| 3,863,713 | 2/1975 | Tramontini | 29/890.03 |
| 3,871,313 | 3/1975 | Yamauchi | 29/505 |
| 3,980,131 | 9/1976 | Perle et al. | 164/61 |
| 4,098,587 | 7/1978 | Krar et al. | |
| 4,453,593 | 6/1984 | Barthel et al. | 165/89 |
| 4,552,724 | 11/1985 | Matsumoto et al. | 422/138 |
| 4,627,147 | 12/1986 | Kagi | 29/515 |
| 4,661,323 | 4/1987 | Olesen | 422/197 |
| 4,847,051 | 7/1989 | Parenti, Jr. | 422/202 |

FOREIGN PATENT DOCUMENTS

| | | | |
|---|---|---|---|
| 767761 | 10/1971 | Belgium | 165/169 |
| 419728 | 4/1947 | Italy | 257/208 |

*Primary Examiner*—Richard K. Seidel
*Assistant Examiner*—Chuck Y. Mah
*Attorney, Agent, or Firm*—Joseph Januszkiewicz

[57] ABSTRACT

A pressure proof reactor vessel and the method of making such vessel wherein the vessel has a cylindrical one-piece outer wall and a cylindrical one-piece cylindrical inner liner, which liner has a smooth continuous interior surface spaced radially inwardly from the outer wall and concentric thereto. The inner cylindrical wall is formed from a one-piece material with its radial thickness being substantially less than the radial thickness of the outer cylindrical wall. Support means in the form of a spiral is positioned in said space between the cylindrical outer wall and the cylindrical inner liner defining a pathway for the flow of coolant between the outer wall and the inner wall. The support spiral is secured to the outer surface of the one-piece cylindrical inner liner prior to assembling of the inner liner to the outer cylindrical one-piece outer wall.

7 Claims, 3 Drawing Sheets

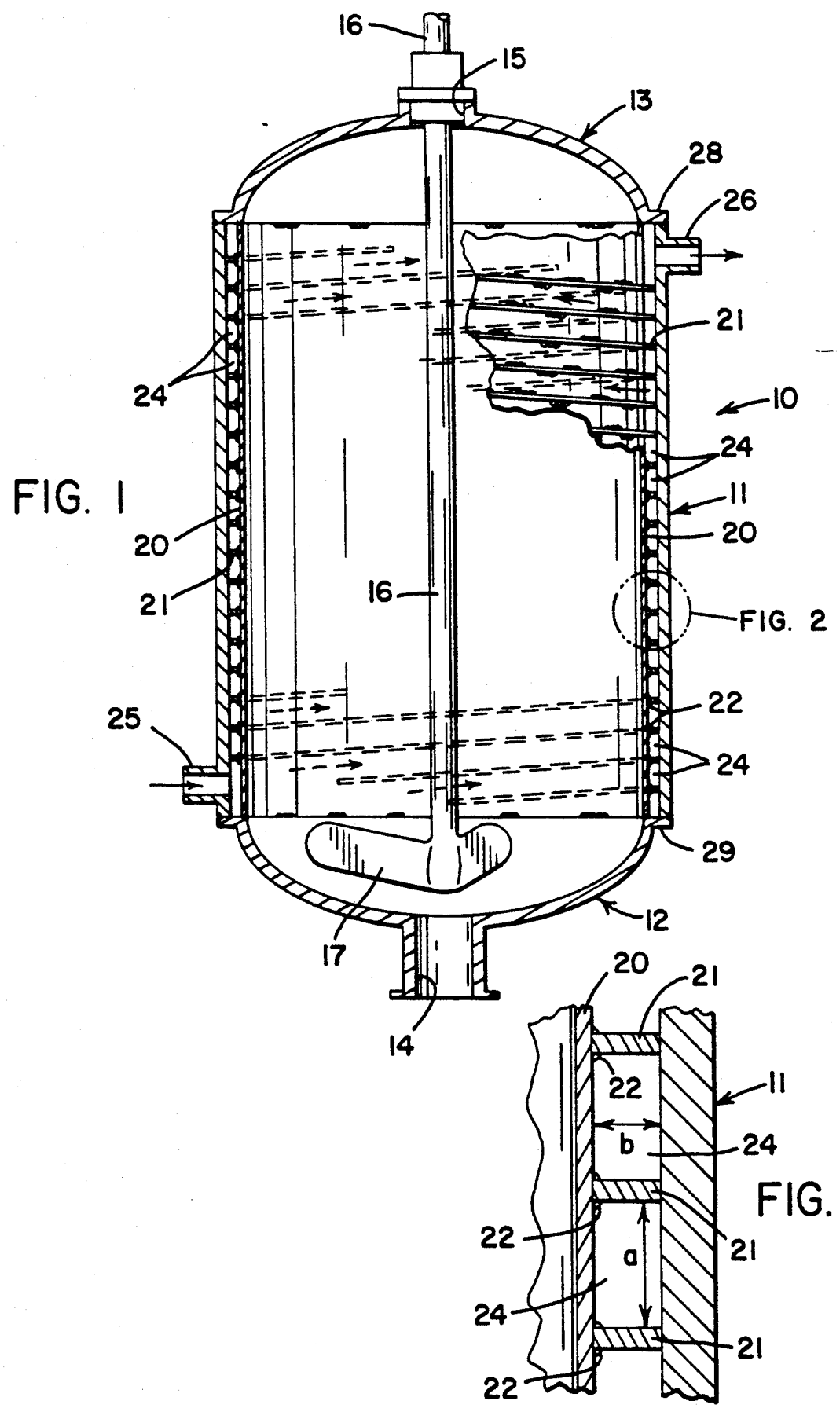

REACTOR VESSEL

This is a divisional of copending application Ser. No. 344,780, filed on Apr. 28, 1989.

BACKGROUND OF THE INVENTION

This invention relates to a reaction vessel or tank structure for use in a suspension polymerization for the manufacture of polyvinyl chloride or vinyl chloride.

In the polymerization process there is an excessive heat build up due to the reaction process and it is necessary to remove such heat to control the speed of reaction process. As larger apparatus or vessels are used to more economically provide the end product it has become necessary to use thicker walls to provide the necessary strength to withstand the increase in pressure. However with this increase in size of vessel and wall thickness there is also a substantial increase in the need to more efficiently remove the heat to properly control the reaction process.

The prior art provision of removing heat in the form of cooling tubes within the reactor vessel is unsatisfactory because of the difficulty of cleaning the interior walls of the vessel and the exterior walls of the cooling tubes due to polymer adhesion thereto and the resulting build-up or accumulation thereon. The provision of external cooling jacket encompassing the reactor vessel has presented the problem of not providing sufficient cooling capacity because of the thickness of the vessel wall prevents efficient cooling. The instant invention provides an internal cooling jacket with a thin innermost wall as one continuous surface thereby presenting a smooth inner wall which inhibits the unsatisfactory build-up of polymer adhesion and accumulation.

SUMMARY OF THE INVENTION

A pressure proof reactor vessel and the method of making such vessel wherein the reactor vessel has an outer cylindrical shell encompassing a cylindrical inner liner made from a single one-piece sheet of metal. Either a spiral support or vertical supports are attached to the inner liner first and then the inner liner and its supports are cooled while the outer shell is heated and then located onto the inner liner to encompass such liner. On equalizing the temperatures of the shell and liner, the liner and supports are firmly secured to the shell and define a flow path for circulating coolant to effect proper cooling. The cross sectional thickness of the walls of the liner and supports are substantially less than the cross sectional thickness of the shell.

BRIEF DESCRIPTION OF THE DRAWINGS

FIG. 1 is a side elevational view partly in cross-section of a reactor vessel;

FIG. 2 is an enlarged sectional view of the circled portion of the reactor vessel shown in FIG. 1;

DETAILED DESCRIPTION

Figure 3:
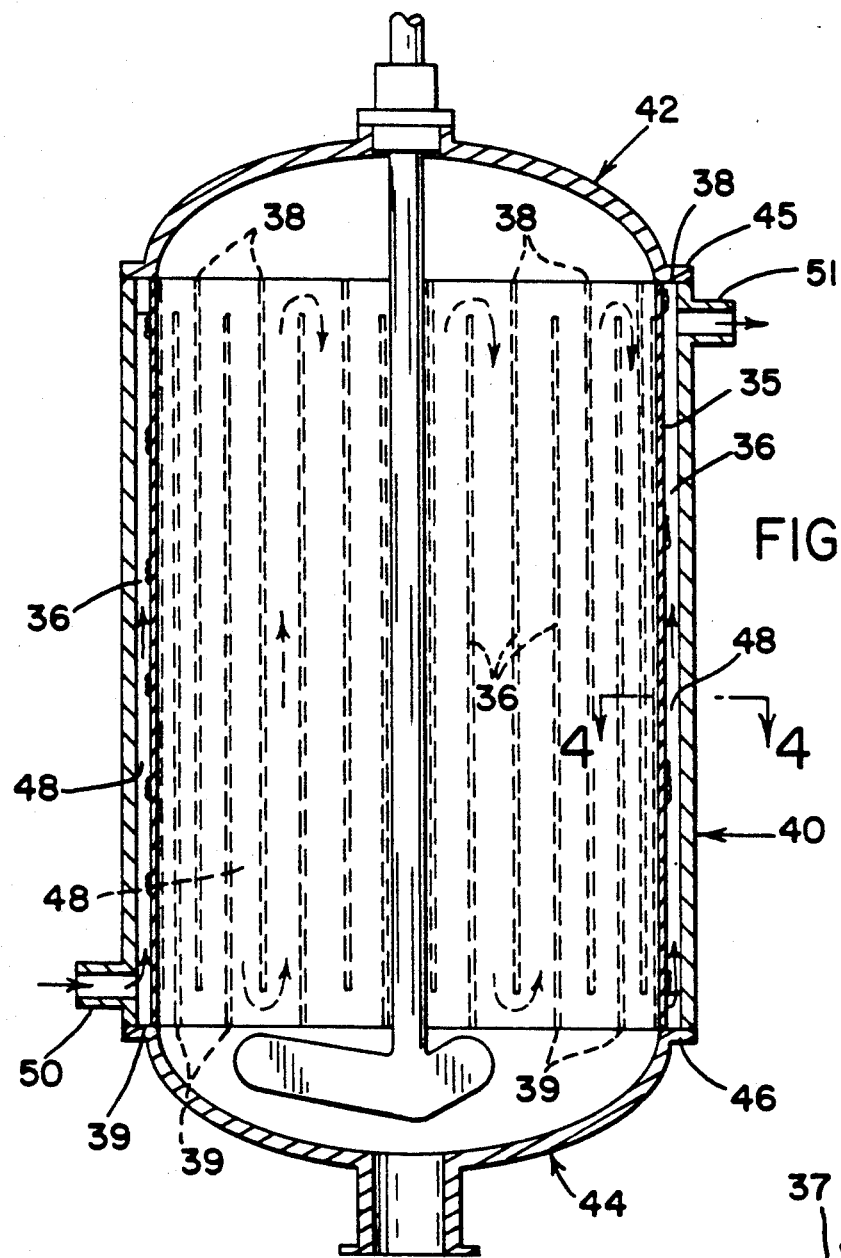
FIG. 3 is a side elevational view in cross-section of a modified embodiment of the invention similar to the view in FIG. 1.

Referring to the drawings wherein like reference numerals designate like or corresponding parts throughout the several views, there is shown in FIGS. 1 and 2 a closed reactor vessel 10 having a main cylindrical portion or shell 11 with its lower end closed by a lower semi-spherical or dish-like member 12 and its upper end closed by an upper semi-spherical or dish like member 13. Vessel as used hereinafter means a tank or container of large capacity as of 1000 gallons or more. Such dish like members 12 and 13 are suitably welded to the shell or the cylindrical portion 11 to form the closed reactor vessel 10. The lower dish like member 12 has an outlet port 14 which is suitably controlled by a valve means not shown. The upper dish like member 13 has a central opening 15 through which extends a shaft 16 having mounted on its one end a paddle 17 that is suitably rotated to perform a mixing function within the reactor tank. Such upper dish like member 13 also has suitable (manhole) openings not shown for charging or introducing products into the reactor vessel.

An inner jacket is located within such cylindrical portion 11 of the reactor vessel 10 and consists of a thin one piece cylindrical sleeve 20 with a continuous spiral support or ribbon 21 encircling such sleeve 20 and suitably connected thereto as by welding as at 22 (FIG. 2). Such welding of the spiral support 21 to the sleeve 20 is done to the external or radially outermost wall surface of the sleeve 20. Such support or ribbon 21 forms a radial partition or wall that is perpendicular to the cylindrical portion 11 and sleeve 20 of the reactor vessel 10. The sleeve 20 and the continuous spiral support 21 may take the form of a strip which is connected to the sleeve 20 in one continuous operation exterior of the vessel 10 prior to its insertion into the cylindrical portion 11. As seen in FIGS. 1 and 2, two adjacent supports 21 cooperate with the sleeve 20 and the cylindrical portion 11 of the reactor vessel 10 to define a spiral chamber or passageway 24 that extends from the upper end portion of the reactor vessel spirally to the lower end portion of the reactor vessel. The lower cylindrical portion 11 of the reactor vessel 10 has an inlet 25 connected to the passageway 24 at the lower portion of the reactor vessel while the upper cylindrical portion 11 has an outlet 26 connected to the passageway 24 to provide a continuous flow path for coolant fluid around the entire sleeve 20.

As seen in FIG. 1, the upper and lower dish like members 12 and 13 have an annular flange 28 and 29 respectively that abut the sleeve 20 to provide a seal for the passageway 24. Such juncture of the flanges 28, 29 and the sleeve 20 can be welded to assure a fluid tight fit.

As an example of the dimensions of the passageway formed by the support and sleeve, the vertical distance "a" between two adjacent supports 21 (FIG. 2) can be 2 (5.08 cm) to 3 (7.62 cm) inches while the width or distance "b" of such passageway is between ½ inch (1.27 cm) to one inch (2.54 cm) and with the wall thickness of the sleeve 20 approximately 0.25 inch (0.635 cm).

To assemble such reactor vessel, the sleeve 20 is made from a thin piece of metal (thin relative to the thickness of the outer cylindrical shell 11) into a cylinder loop and welded also a single line. Thereafter a continuous strip or support 21 is welded as at 22 in a spiral path around such cylinder 20. With the chilling of such sleeve 20 along with its support 21 while heating the outer cylindrical portion 11 of the reactor vessel, such sleeve 20 is slipped into the cylindrical portion 11 and then upper and lower dish like members 12 and 13 are secured thereto along with the inlet 25 and outlet 26. With such structure the inner sleeve 20 has the same coefficient of expansion as the cylindrical portion 11 providing a smooth inner cylindrical continuous surface that is resistant to polymer adhesion and build up while also providing an efficient cooling of the reacting medium in the reactor vessel due to the very thinness of the sleeve 20 relative to the thickness of cylindrical portion 11 wherein the thickness of the sleeve 20 is substantially less than the thickness of the outer shell or cylindrical portion 11 of reactor vessel 10, which outer shell can be made of sufficient thickness to withstand the tremendous pressures of the polymerization process. With such inner sleeve 20 made from a one-piece structure the innermost wall surface is smooth and inhibits unsatisfactory polymer build-up.

Figure 5A:
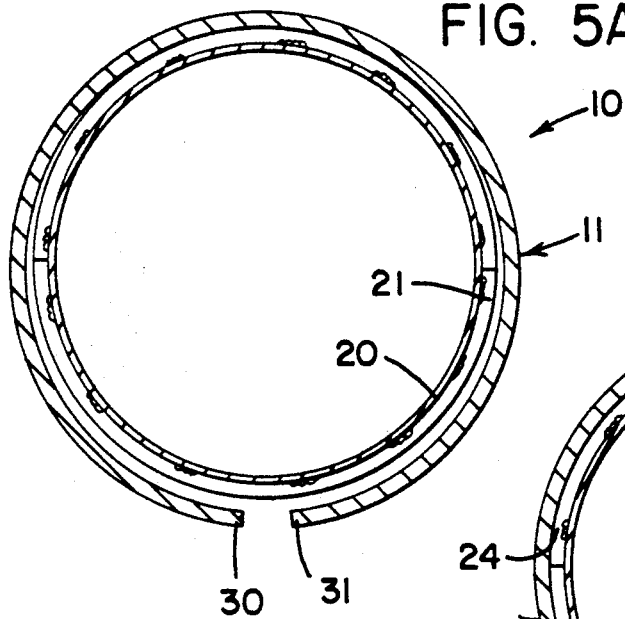
FIGS. 5A and 5B are plan views of the assembling of the cooling jacket to the internal wall of the reactor vessel shown in FIGS. 1 and 2, showing the vessel wall encompassing and being secured to the jacket.
Figure 5B:
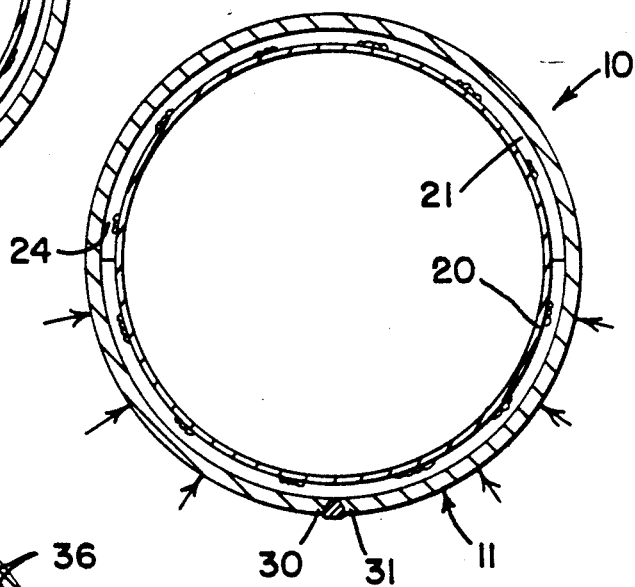

FIGS. 5A and 5B illustrate an alternative method of assembling the reactor tank described above. Herein, on completion of the sleeve 20 and support 21 as previously described, the exterior shell 11 is then wrapped around the sleeve 21 with sufficient pressure applied as illustrated in FIG. 5B until the respective ends 30 and 31 of the outer shell closely abut each other after which such ends 30 and 31 are welded to form a unitary whole.

Figure 4:
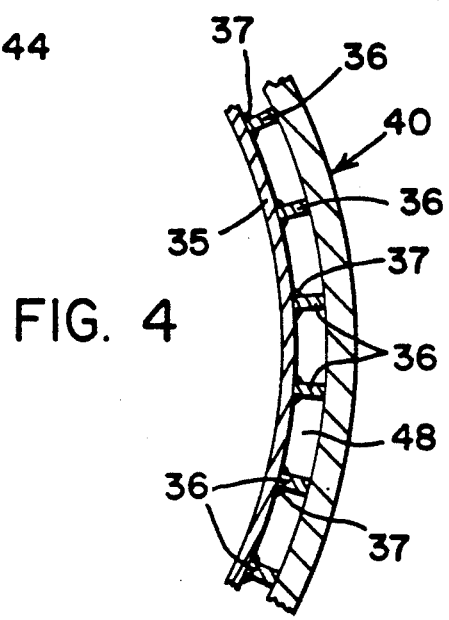
FIG. 4 is an enlarged cross-sectional view of a portion of the wall of the vessel and the cooling jacket taken on line 4—4 of FIG. 3.

A further embodiment of the reactor vessel is shown in FIGS. 3 and 4 wherein a cylindrical sleeve 35 is made from a flat thin rectangular piece of metal such as austenitic-ferritic stainless steel wherein such thin metal sheet is formed into a cylindrical loop and welded. Thereafter thin vertical strips 36 of steel are spot welded as at 37 to the periphery of the cylindrical sleeve 35. In performing this operation, the strips 36 are all of the same length however alternate strips 36 have their one ends (upper ends) 38 located along a plane that is flush with the upper end portion of the sleeve 35 while the remaining alternate strips 3 have their lower ends 39 located along a plane that is flush with the lower end portion of the sleeve 35, thus leaving the respective ends below or above adjacent one ends 38 and 39 to define a serpentine flow path to be described An outer cylindrical shell 40 of substantial greater thickness than the sleeve 35 is formed around the vertical strips 36. Such shell 40 is formed from a rectangular piece of metal, preferably austro ferric stainless steel, the same metal used to form the sleeve 35 and is formed around the strips into a cylindrical shell and then welded as described in the first embodiment. Thereafter an upper dish like member 42 and a lower dish like member 44 are suitably welded to the respective upper and lower portion of the sleeve 35 and the shell 40. With the annular flanges 45 and 46 on the respective dish like members 42 and 44, and the strips 36 alternating in height, there is formed a continuous serpentine passageway 48 as depicted by FIG. 3.

The lower end of cylindrical shell 40 has an inlet opening 50 communicating directly with passageway 48 while the upper end of cylindrical shell 40 has an outlet opening 51 also communicating with passageway 48 such that with coolant fluid pumped into passageway 4B via inlet opening 50, such coolant flows in a serpentine path around such sleeve 35 and exiting via outlet opening 51. The number of inlet and outlet openings used on the shell 40 can be varied to provide the desired cooling of the reactor tank as discussed above.

Figure 6A:
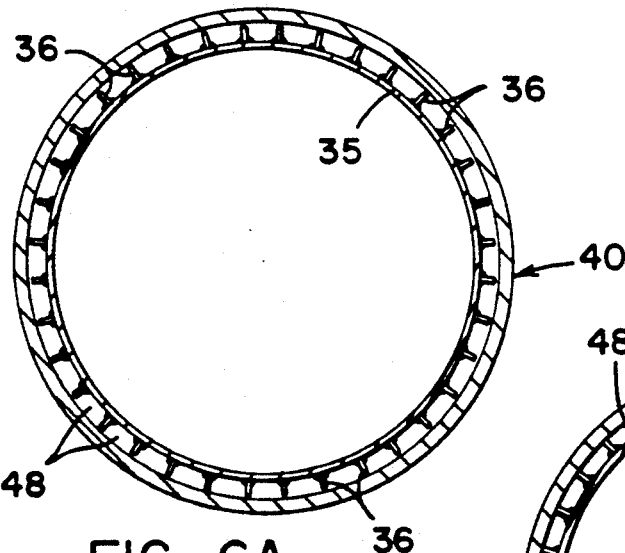
FIGS. 6A and 6B are plan views of a modified construction of a reactor tank and a cooling jacket showing the securing of the cooling jacket to the tank constructed according to the invention shown in FIGS. 3 and 4.
Figure 6B:
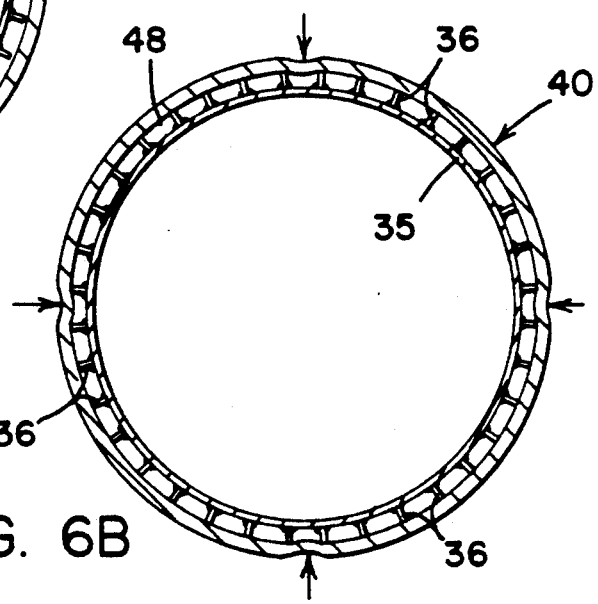

A modification of the assembly of such reactor vessel other than described above is to cut a sheet of metal into a rectangular piece or shape and then form such rectangular piece into a cylindrical loop and weld such loop along adjoining or abutting edges. This operation forms a smooth internal surface to the cylinder. Thereafter the thin vertical strips 36 are welded to the external surfaces of the sleeve 35 in the manner and location as described above. The outer cylindrical shell 40 which can be preformed is heated while the internal sleeve 35 with its vertical strips 36 are chilled, after which the heated shell 40 is slipped over the sleeve 35 and then both are brought to the same ambient temperatures and are shown in FIG. 6A. Upper and lower dish like members 42 and 44 are secured to the shell 40. Inlets 50 and 51 are identical as described above and provide the continuous flow path. A further modification of the assembling of such structures is shown in FIG. 6B which discloses that the inside diameter of the outer shell 40 can be slightly larger than the outside diameter of the sleeve 35 with its vertical strips 36 and that after slipping the outer shell 40 over sleeve 35, such shell 40 can be deformed at ninety (90°) degree locations around the vessel to provide a frictional engagement between the components of the shell 40 and the vertical strips 36.

It is preferred that the vessel's inner sleeve and the spiral support or the vertical strip supports along with the outer shell be of high strength Austenitic-Ferritic Stainless Steel although a variation thereon may have the outer shell of conventional carbon steel. Where the vertical strips provide a serpentine flow, there can be four separate zones 1.e. four inlet pipes 50 and four outlet pipes 51, with each zone able to pass three hundred gallons of cooling fluid per minute. Austenitic-ferritic stainless steel has a higher thermal and a much higher strength than conventional stainless steel. By electropolishing the inner surface of the sleeve there is less build-up of polymer on the wall surface. The number of separate flow zones used can be varied to achieve a desired cooling result.

It will be apparent that, although a specific embodiment and certain modifications of the invention have been described in detail, the invention is not limited to the specifically illustrated and described constructions since variations may be made without departing from the principles of the invention.

We claim:

1. A method of making a large capacity closed pressure proof reactor vessel for use in a suspension polymerization process for the manufacture of vinyl chloride comprising the steps of forming an inner cylindrical sleeve from a single continuous sheet of metal with a single lengthwise weld to form such cylindrical sleeve, welding one running edge of a longitudinally extending ribbon into a continuous spiral ribbon to the outer wall surface of said inner sleeve, forming from a single sheet of metal an outer cylindrical shell around said inner sleeve by pressing the inner surface of said shell firmly against the other running edge of said continuous spiral ribbon and thence welding two edges of said outer shell to form a cylindrical shape and forming a continuous spiral flow path around said inner sleeve by the cooperation of said shell and said sleeve with said spiral ribbon, providing an upper cap and a lower dish like member to said outer cylindrical shell to form said closed pressure proof rector vessel, and providing an inlet and an outlet port to said reactor vessel that communicates with said spiral flow path.

2. A method of making a reactor vessel as set forth in claim 9 wherein the wall thickness of said inner sleeve is substantially less than the wall thickness of said outer shell.

3. A method of making a reactor vessel as set forth in claim 2 wherein said inner sleeve with said spiral ribbon is cooled while said outer cylindrical shell is heated prior to assembling of said shell around said inner sleeve.

4. A method of making a large closed pressure-proof reactor vessel for use in a suspension polymerization process for the manufacture of vinyl chloride comprising the steps of forming an inner cylindrical sleeve from a one-piece sheet of metal having a single lengthwise weld; attaching a metal ribbon to the outer surface of said sleeve in a continuous manner around said sleeve as by welding to form a spiral ribbon attachment thereto; forming a metal outer cylinder whose inner diameter is equal in dimension to the outer diameter of said spiral ribbon around said sleeve with said sleeve wall thickness being substantially less than the wall thickness of said outer cylinder; heating said outer cylinder while cooling said sleeve; positioning said heated outer cylinder over said cooled sleeve to encompass said sleeve to provide a continuous passageway as defined by said sleeve, said cylinder and said spiral ribbon attachment; adhering an upper cap and a lower dish-like member to said cylinder to form a closed reactor vessel; and providing an inlet and an outlet port to said vessel for connection to said passageway.

5. A method of making a reactor vessel comprising the steps of forming an inner cylindrical sleeve from one-piece sheet of metal having a single lengthwise weld; attaching a metal support means to the outer surface of said sleeve for preparing a passageway; forming a metal cylinder with a wall thickness that is substantially greater than the wall thickness of said sleeve; positioning said cylinder around said sleeve to encompass said sleeve; deforming certain spaced portions of said cylinder radially inwardly to firmly and frictionally encompass said metal support to make a passageway between said sleeve cylinder and support means; adhering a cap and a lower member to said cylinder to make a closed vessel; and attaching an inlet and an outlet port to said vessel for connection to said passageway.

6. A method of making a reactor vessel as set forth in claim 5 wherein said support means is a spiral continuous ribbon when attached to said sleeve.

7. A method of making a reactor vessel as set forth in claim 15 wherein said support means is a plurality of vertical strips that are cooperative with said cylinder and said sleeve to define a serpentine path around said sleeve.

* * * * *